April 14, 1970 R. S. SAKURAI 3,506,971

APPARATUS FOR ELECTROSTATICALLY STORING SIGNAL REPRESENTATIONS

Original Filed Sept. 23, 1964

INVENTOR.
RICHARD S. SAKURAI

BY George L. Kensinger

AGENT

United States Patent Office 3,506,971

Patented Apr. 14, 1970

3,506,971

APPARATUS FOR ELECTROSTATICALLY STORING SIGNAL REPRESENTATIONS

Richard S. Sakurai, Oxford, Ohio, assignor to Burroughs Corporation, Detroit, Mich., a corporation of Michigan Continuation of application Ser. No. 398,717, Sept. 23, 1964. This application June 23, 1969, Ser. No. 838,035

Int. Cl. G11c *11/32*

U.S. Cl. 340—173 5 Claims

ABSTRACT OF THE DISCLOSURE

This invention relates to an apparatus for storing data signals on a doped semiconductor body having a pair of interrogating electrodes. A signal-representing electrical charge is electrostatically deposited upon a dielectric contiguous with the doped semiconductor body to induce electrical surface charge on the semiconductor and thereby control its conductivity. The stored signal can be read repeatedly without destruction.

This applicaton is a continuation of application Ser. No. 398,717, filed Sept. 23, 1964, now abandoned.

This invention relates to the storage of information signals in electronic memory systems of the type utilized in electrical computing apparatus. More specifically, the subject invention relates to a novel apparatus for electrostatically storing signal representations in a semiconductor memory device which may be read out nondestructively.

Electronic memory systems capable of storing intelligence information are useful in the mechanization of machines for performing electrical computation. Desirable characteristics of such memory apparatus are: small size, for enabling high density storage of information signals, simplicity of construction, and minimization of the expense of fabrication. It is also desirable in many applications for the memory apparatus to be responsive to interrogation signals for indicating the stored signal information without destruction or degradation of the signal representing state of the memory element.

Several means for storing information are presently used in which the signal information is stored in the form of a magnetic flux or charge. Two types of such magnetic memory systems are apparatus utilizing magnetic tape and apparatus employing magnetic cores. Disadvantages of these types of memory systems are expensive construction, low signal output, complex wiring, and necessity of associated driving and amplifying apparatus.

The signal storage apparatus of the present invention achieves the desired nondestructive storage of information signals in a small volume memory device not subject to the aforementioned disadvantages of prior art memory devices. The invention utilizes the phenomenon of space charge control of conductivity in semiconductive bodies, which was reported by W. Shockley and G. L. Pearson in "Modulation of Conductance of Thin Films of Semi-Conductors by Surface Charges," Physical Review, vol. 34, pp. 232–233 (1948), and later described by W. Shockley at pp. 29–34 of Electrons and Holes in Semiconductors (D. van Nostrand, New York, N.Y., 1950). These publications report the discovery that the conductive properties of a thin layer of semiconductive material may be varied by bringing a charged conductor within close proximity to the surface of the semiconductor. This phenomenon may be demonstructed by utilizing the semiconductive material as one plate of a parallel plate capacitor. The close proximity of the charged conductor causes a charge to be induced on the surface of the semiconductor. This surface charge creates a depletion of current carries within the semiconductor body as if a space charge existed therein. It has been further discovered, as reported by W. Shockley in "A Unipolar 'Field-Effect' Transistor," Proc. IRE, vol. 40, pp. 1365–1376 (November 1952), that a semiconductor body may be rendered almost nonconductive by providing a suitably large amount of charge on the surface of the body.

An object of the present invention is to utilize the effect of surface charge upon unipolar conduction in thin semiconductor bodies in a simple memory device having nondestructive read-out capabilities.

A further object of the present invention is to improve the output signal obtainable from electronic memory systems and to increase the density of signal storage in electrical computing machines.

A still further object of this invention is to simplify the construction of electrical memory devices and to eliminate complicated and costly wiring arrangements.

Another object of this invention is to increase the output signal magnitude of electronic memory systems while achieving the nondestructive read-out features.

According to the present invention, information signal representations are stored or recorded in a semiconductor memory device by depositing charge from an electric discharge or from a source of electrons, such as a cathode ray device, onto the surface of a layer of a dielectric for electrostatically inducing charge on the surface of the semiconductor, thereby affecting the conductivity of the semiconductive material.

In an illustrated system incorporating the information signal storage apparatus of the present invention, a plurality of chips or plaques of semiconductive material are positioned upon a sheet of dielectric for use in the recording or storage of a plurality of information signals by surface-charge control of conduction in the semiconductor chips.

A feature of the present invention resides in the physical separation of the recording means from the memory device. No interconnecting wiring or windings are required and therefore each writing or recording head may be used in combination with several storage units or assemblies by moving either the recording head or storage units with respect to the other. A related feature of the invention is the ease with which memory units may be installed, and replaced, if desired.

A further feature of this invention is the low level of current required for storing information signals in the subject apparatus, which is a consequence of the use of an electric discharge or electron stream for recording rather than a magnetic field as in other types of memory apparatus.

The foregoing and other objects of the subject invention as presented in this specification will be readily apparent from the following description and claims together with the accompanying drawing wherein:

Figure 1:
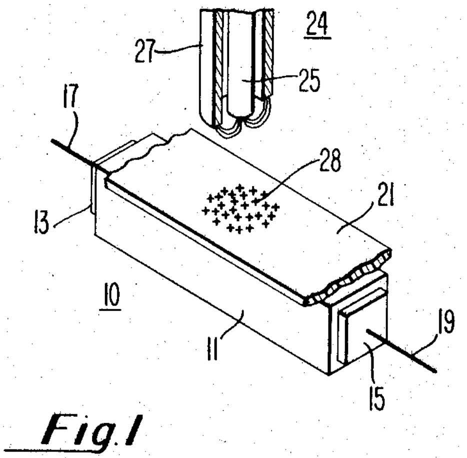
FIG. 1 is a perspective view of apparatus for practicing applicant's invention.

Referring to FIG. 1, an electrostatic memory device in accordance with the subject invention is fabricated from a layer or crystal of semiconductive material 11 against which source electrode 13 and drain electrode 15 are placed for conducting current through the semiconductive material. The source and drain electrodes are preferably located at opposite faces or edges of the layer or crystal of semiconductive material. Source electrode 13 and drain electrode 15 are connected respectively to input conductor 17 and output conductor 19. The semiconductor body 11 may be a layer of either N-type or P-type doped semiconductive material, that is, the semiconductor body may have within it excess unbound electrons or excess "holes" for making possible current through the body.

The source and drain electrodes may be attached to the semiconductor body by any of several well-known methods of establishing electrical contact between an electrode or conductor and a body of semiconductive material. This connection of the source and drain electrodes, which respectively serve as the interrogation and output terminals of the device, by simply establishing a low resistance or "ohmic" contact with the layer of semiconductive material is far simpler and less expensive than the windings required in many conventional memory devices. A consequent saving in fabrication expense and elimination of wiring complexity, in addition to simplification of construction, is thereby achieved.

The conductivity of the semiconductor body may be varied by developing a charge on its surface as described in the above-mentioned publications. In order to store electrical signals utilizing this phenomenon, a charge representative of the signal to be stored must be developed on the surface of the semiconductor and maintained after termination of the signal.

Figure 1A:
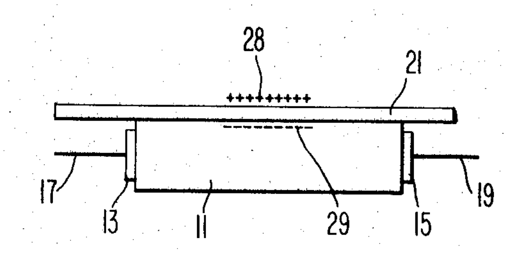
FIG. 1A is a longitudnal cross-sectional view of the memory device of the apparatus of FIG. 1.

Development of charge on the semiconductor surface is accomplished by depositing a charge upon dielectric film or layer 21 which is placed in contact with one or more surfaces of the semiconductor body, thereby inducing an opposite polarity charge on the semiconductor between the source and drain electrodes, as illustrated in FIG. 1A. The polarity of charge employed and the type of charge source to be utilized will depend upon the type of semiconductive material utilized in the device. The dielectric film or layer 21 is preferably placed in contact with a surface or surfaces orthogonal to the faces or edges of the semiconductor body to which the source and drain electrodes are attached.

FIG. 1 illustrates the utilization of an electric discharge device 24 for depositing the necessary charge upon dielectric film 21. The charge 28 is deposited at a location between and displaced from the source electrode 13 and the drain electrode 15. Pin electrode 25 is supported within and spaced apart from coaxial cylindrical electrode 27, said electrodes being situated so that they terminate at approximately the same distance from the dielectric surface. For recording an information signal, a potential is developed across the pin and cylindrical electrodes of sufficient magnitude to initiate at least a spark discharge therebetween. Charge is deposited upon the dielectric by directing a portion of the resulting ion cloud or plasma toward the dielectric surface by physically "focusing" the electrodes and supplying sufficient bias voltage between the electrodes and the semiconductor body. A continuously operating discharge means controllably shielded from the dielectric slab may also be utilized for selectively depositing the necessary charge. Charge from the ion cloud or plasma is attracted to the dielectric surface by a difference in potential between the sparking electrodes and the semiconductor body established by biasing the discharge electrodes with respect to a semiconductor electrode.

Any of the various techniques utilized in electrostatic printing may be employed for depositing the required charge on dielectric film 21. The charge may be initiated, for example, by a discharge technique as described in Benn et al. Patent No. 3,068,479 or by a cathode ray technique of the type illustrated in Epstein Patent No. 2,967,082, both of which are of common ownership herewith. Storage of signals by electric discharge deposition of charge upon the surface of a dielectric film in contact with a layer of semiconductive material eliminates the complex and clostly wiring arrangements necessary for the storage of signals in conventional memory devices. The electrostatic memory device of the present invention thus features the advantage of simplicity and ease of construction over prior art devices.

According to presently accepted theory, charge 29 induced on the surface of a semiconductor operates to produce a charged region similar to a space charge extending within the sericonductor body. This "space charge," by either eliminating or increasing the effective supply free current carriers within a region of the semiconductive material, decreases or increases the conduction of current through that region. Decreasing the supply of current carriers is called operating in the depletion mode; increasing the supply is called operating in the enrichment or enhancement mode. Variation of the conductivity of the semiconductive material, of course, may be viewed as a change in the resistivity of the semiconductive material.

The greater the surface charge induced upon the semiconductor body, the farther the charged region extends within the semiconductor body, and the greater is the consequent effect upon the conductivity of the semiconductive material. By increasing the amount of charge induced on the surface of the semiconductor block, the charge within the semiconductor body may be increased to a level at which the space charge region extends completely through the semiconductive material and thereby either restricts the conductivity of the semiconductor body to a minimum level or increases it to a maximum level. This surface control of the conductivity of a semiconductor between a high and low or maximum and minimum magnitude may be utilized for storing binary signals representative of the presence or absence of data. Also, by the deposit of discrete charges of incremental amounts upon the dielectric, the level of conduction or resistivity of the semiconductor may be incrementally controlled. Signals whose amplitude represent numerical values or other information may therefore be stored in the subject memory device as well as binary signals. Each signal to be stored must be ascribed a particular amount of charge for establishing a unique level of conductivity in such a multi-level or incremental signal storage method. In such a system, the conductivity of the semiconductor is incrementally controlled for recording a multiplicity of different signals.

The device as shown in FIGS. 1 and 1A is utilized as a memory device for recording signal information through the deposition of charge 28 on dielectric film 21 proportional to or indicative of the information signal to be stored between the source and drain electrodes. Interrogation of the memory device may be accomplished by providing for a current flow between input conductor 17 and output conductor 19, the signal stored being detected by the level of current developed by the interrogational signal. Since dielectric film 21 maintains the charge upon the semiconductor body regardless of current flow through the semiconductor, the storage of an information signal is in no way destroyed or caused to deteriorate by the interrogation-induced current in the semiconductive material. Current in the semiconductor body is developed by establishing a potential between the electrodes attached thereto and the stored signal is read out by detecting the magnitude of the current in the semiconductor upon interrogation of the device.

Charge may be induced on additional surfaces of semiconductor body 11 for increasing the efficiency of control upon its conductivity. Distribution of charge over plural surfaces of the semiconductor may be accomplished by initiating discharges adjacent each dielectric covered surface of the semiconductor or by providing a conductive surface on a dielectric film which at least partially surrounds the semiconductive material and thus inducing charge at least partially around the semiconductor block.

A signal stored in the subject memory device is erased by removing the charge deposited on the dielectric surface. Effective removal of the charge may be accomplished most readily by depositing on the dielectric an equal charge of opposite polarity. This neutralizes the stored charge. The conductivity of the superconductor returns to its normal level upon removal of the charge, and the device is available for storing another signal.

Figure 2:
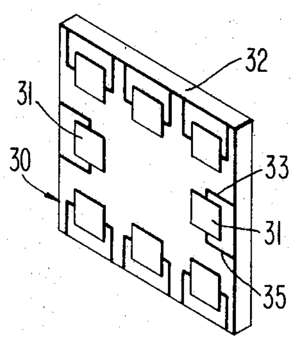
FIG. 2 is a perspective view of a multi-element memory apparatus comprising a plurality of memory devices of the type illustrated in FIGS. 1 and 1A.

FIG. 2 illustrates a multiple-element memory apparatus which may be utilized in memory systems which require a plurality of chips or plaques of semiconductive material for storing a plurality of information signals. Chips or plaques of semiconductive material 31 are mounted or formed upon a sheet of dielectric material 32 and are provided with input terminals 33 and output terminals 35 as shown. The semiconductive plaques are insulated from each other and placed upon the continuous sheet of dielectric. The chips or plaques may be formed, for example, by utilizing the techniques of electroforming, etching, electrodeposition, or evaporation techniques. Each of the elements of the array of storage elements of the memory apparatus of FIG. 2 performs the signal storage function in the same manner as the memory device of FIGS. 1 and 1A.

Figure 3:
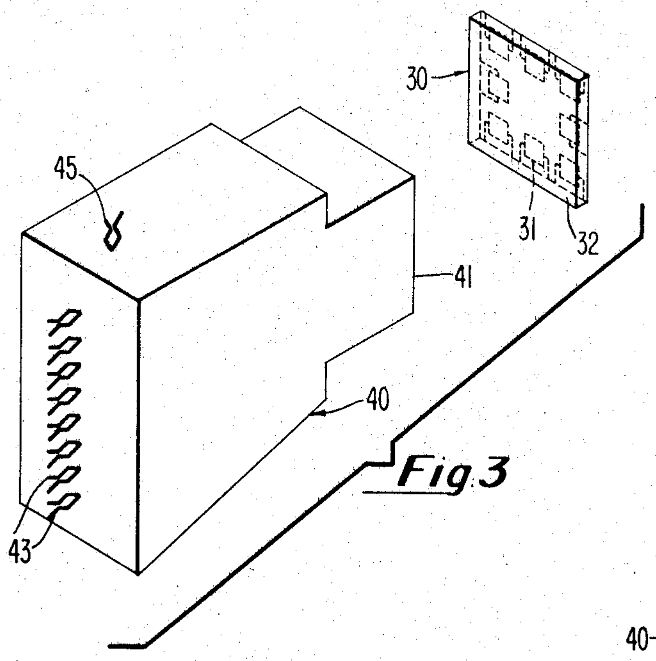
FIG. 3 is a perspective view of an apparatus constructed in accordance with the subject invention for recording a plurality of information signals.

FIG. 3 is a perspective view of an apparatus for selectively recording a plurality of information signals utilizing multi-element memory apparatus 30 illustrated in FIG. 2. Recording head 40 serves as the source of controlled electrical discharges for selectively depositing charge on the surface of dielectric sheet 32 opposite memory elements 31. Controlled electrical discharges are initiated at the recording face 41 of the recording head between a pin or sparking electrode and individual cylindrical electrodes as in the apparatus of FIG. 1 or with an electrode common to and located adjacent several of the pin electrodes. Control signals are applied to pin electrode terminals 43 and common electrode terminal 45 for selectively initiating the desired discharges in the illustrated embodiment.

During the operation of the apparatus of FIG. 3, charge is selectively deposited upon dielectric sheet 32 on the surface opposite the semiconductor chips 31. This selective deposition of charge, at a location between and displaced from the terminals 33 and 35, may be accomplished by using, for example, a discharge apparatus of the type illustrated in United States Patent No. 2,918,-580 to R. S. Howell of the type illustrated in United States Patents Nos. 2,931,065; 2,974,368; and 3,071,685 of C. R. Joyce; 3,012,839 of H. Epstein et al.; or the aforementioned Benn et al. U.S. Patent No. 3,068,479; all these patents being of common ownership herewith. A coincident signal charging technique in which two or more signals are applied to the charging apparatus may also be employed, either for initiating the deposit of charge or for additively depositing operative amounts of charge opposite selected elements of a matrix for the storage of information coded in the form of binary signals.

Figure 4:
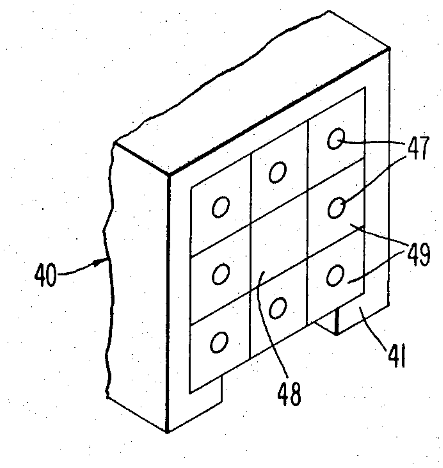
FIG. 4 is a perspective end view, partly broken away, of one arrangement of electrodes for the operating face of the recording head of the apparatus of FIG. 3.

The drawing of FIG. 4 is a perspective view, partly broken away, of an arrangement of discharge electrodes for operating face 41 of recording head 40. Pin electrodes 47 are mounted within and spaced apart from cylindrical electrodes 49, each of which is supported by a nonconductive material such as an epoxy resin and insulated from other electrodes. The controlled electrical discharge occurs between selected pin and cylindrical electrodes. There must be a pin or sparking electrode for each signal storage location in the multi-element memory apparatus employed. For recording upon an incomplete matrix of memory devices such as the multi-unit apparatus of FIG. 2, unneeded electrodes such as the center pin electrode (not shown) of the recording matrix of FIG. 4 may remain unconnected or a spacer such as rod 48 of FIG. 4 may be employed in the recording head array.

Figure 5:
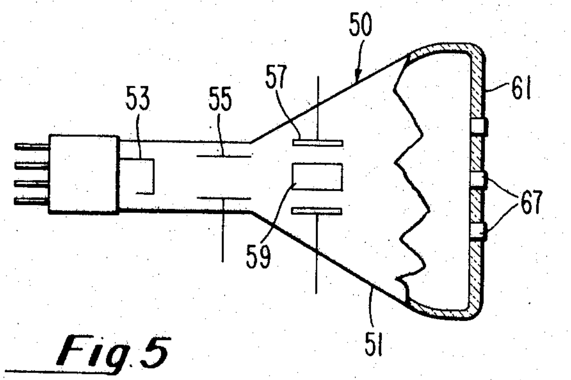
FIG. 5 is a side view, partly broken away, of a cathode ray tube which may be used for recording information signals in accordance with the invention.

FIG. 5 illustrates a cathode ray tube adapted for selectively depositing charges on a multi-element memory apparatus. Cathode ray recording head 50 is fabricated from a cathode ray tube 51 having recording electrodes 67 embedded in tube face 61, in the manner described, for example, in H. Moss United States Patent No. 3,041,-611, assigned to the assignee of the present invention. Cathode ray tube 51 may be of conventional design except as to the face 61. In common with conventional tubes it includes an emissive cathode 53, accelerating electrodes 55 and two pairs of opposed electrostatic beam deflecting electrodes 57 and 59 for vertical and horizontal control respectively. An electron beam-forming potential is applied to cathode 53 from a source of high voltage, and an accelerating potential may be applied to electrodes 55. Cathode heater means are omitted in the figure.

The electron beam from the cathode establishes a negative potential on the recording electrodes as it impinges on them. By establishing a sufficient potential difference between an energized electrode and a semiconductor element, a flow of electrons to the dielectric may be achieved. This electron flow causes an electrical charge to appear on the dielectric layer which is proximate the semiconductor body and thus causes the storage of an information signal. The intensity of the electron beam may be signal-modulated if it is desired to store analog signals of discrete levels of deposited charge by controlling the conductivity of the semiconductor in discrete amounts. It should be noted that the semiconductor memory matrix may also be embedded in the face of the cathode ray tube or within the tube envelope itself, thus eliminating the need for recording electrodes in the cathode ray tube embodiment.

I claim:

1. A semiconductor memory device comprising:
   - a layer of doped semiconductor,
   - a pair of interrogating electrodes placed on a first and a second surface of said layer,
   - a dielectric film contiguous with a third surface of said layer other than an electrode carrying surface, and
   - means for depositing charges upon said film at a location displaced from said electrodes for changing the conductivity of said layer, said conductivity change being sensed by said electrodes.

2. An electrostatic memory unit comprising:
   - a sheet of impurity-containing multisurfaced semiconductive material,
   - a pair of sensing electrodes affixed to spaced apart surfaces of said sheet,
   - an unbroken dielectric in contact with a surface of said sheet other than said spaced apart surfaces, and controlled electrical discharge means for depositing charged particles upon the dielectric at a location displaced from said electrodes for changing the conductivity of said semiconductive material, said change being sensed by said pair of electrodes.

3. An electrostatic memory device for storing information comprising:
   - a body of impurity-containing semiconductive material having a plurality of surfaces,
   - at least two plate electrodes affixed to distinct surfaces of said body,
   - a layer of dielectric material proximate a surface of said body other than an electrode affixed surface, and an electrical discharge means for creating a cloud of charged particles and placing a discrete electrical charge upon a central portion of said dielectric layer between said electrodes and displaced therefrom to induce a conductivity controlling charge on the semiconductor body, said conductivity controlling charge being sensed by said electrodes.

4. An electrostatic information recording unit having a variable conductivity state comprising:

a semiconductive layer having a plurality of surfaces, a pair of sampling electrodes placed on two surfaces of said layer, an unbroken dielectric sheet contiguous to a third surface of said layer other than an electrode carrying surface, and means for generating an electrical potential induced spark discharge adjacent said dielectric sheet and producing a conductivity controlling charge on said dielectric sheet at a position between and displaced from said sampling electrodes, said conductivity controlling charge being sensed by said electrodes.

5. Electrostatic signal storage apparatus comprising:

an unbroken layer of dielectric material, a plurality of semiconductor plaques arrayed on distinct and separate portions of said layer, each of said plaques having a surface containing said layer and at least two other distinct electrode receiving surfaces, a source and drain electrode placed on the respective receiving surfaces of each of said plaques, an electrostatic recording head positioned adjacent said layer and having a plurality of electrode pairs complementary to said arrayed plaques, and means for selectively establishing a potential on said electrode pairs for depositing charge upon the dielectric material opposite a predetermined plaque at a location displaced from and on a surface other than said source and drain electrode receiving surfaces and inducing a conductivity change in said predetermined plaque, said conductivity change being sensed by said electrodes.

References Cited

UNITED STATES PATENTS

| | | | |
|---|---|---|---|
| 2,547,386 | 4/1951 | Gray | 328—123 |
| 2,798,185 | 7/1957 | Hansen | 340—173 |
| 2,805,360 | 9/1957 | McNaney | 315—173 |
| 2,859,376 | 11/1958 | Kirkpatrick | 340—173 |
| 2,901,662 | 8/1959 | Nozick | 340—173 |

TERRELL W. FEARS, Primary Examiner

U.S. Cl. X.R.

328—123

PO-1050
(5/69)

UNITED STATES PATENT OFFICE
CERTIFICATE OF CORRECTION

Patent No. 3,506,971 Dated April 14, 1970

Inventor(s) Richard S. Sakurai

It is certified that error appears in the above-identified patent and that said Letters Patent are hereby corrected as shown below:

Column 1, line 44, "for" should be --of--; column 1, line 68, "demonstructed" should be --demonstrated--; column 2, line 1, "carries" should be --carriers--; column 2, line 21, "features" should be --feature--; column 4, line 8, "clostly" should be --costly--; column 4, line 16, "sericonductor" should be --semiconductor--; column 4, line 63, "interrogational" should be --interrogation--; column 5, line 55, before "of" insert --or--; column 5, line 55, "type" should be --types--; column 7, line 26, "containing" should be --contacting--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents